US012692380B2

(12) United States Patent
Uematsu

(10) Patent No.: US 12,692,380 B2
(45) Date of Patent: Jul. 28, 2026

(54) POLYMERIZABLE COMPOSITION AND MANUFACTURING METHOD FOR ELEMENT-MOUNTED SUBSTRATE

(71) Applicant: TOKYO OHKA KOGYO CO., LTD., Kawasaki (JP)

(72) Inventor: Teruhiro Uematsu, Kawasaki (JP)

(73) Assignee: TOKYO OHKA KOGYO CO., LTD., Kawasaki (JP)

(*) Notice: Subject to any disclaimer, the term of this patent is extended or adjusted under 35 U.S.C. 154(b) by 47 days.

(21) Appl. No.: 18/255,848

(22) PCT Filed: Nov. 30, 2021

(86) PCT No.: PCT/JP2021/043797
§ 371 (c)(1),
(2) Date: Jun. 2, 2023

(87) PCT Pub. No.: WO2022/138012
PCT Pub. Date: Jun. 30, 2022

(65) Prior Publication Data

US 2024/0010829 A1 Jan. 11, 2024

(30) Foreign Application Priority Data

Dec. 25, 2020 (JP) ................................ 2020-216450

(51) Int. Cl.

| | |
|---|---|
| ***C08L 33/26*** | (2006.01) |
| ***C08F 2/50*** | (2006.01) |
| ***C08F 222/38*** | (2006.01) |

(52) U.S. Cl.
CPC ................ *C08L 33/26* (2013.01); *C08F 2/50* (2013.01); *C08F 222/38* (2013.01)

(58) Field of Classification Search
CPC .... C08L 33/26; C08L 1/00; C08F 2/50; C08F 222/38; C08F 2/44; C08F 251/02; C09D 4/00; H01L 23/29; H01L 23/31
See application file for complete search history.

(56) References Cited

U.S. PATENT DOCUMENTS

| | | | | |
|---|---|---|---|---|
| 2004/0141121 | A1 | 7/2004 | Tanaka et al. | |
| 2013/0163255 | A1 | 6/2013 | Kim | |
| 2016/0291475 | A1* | 10/2016 | Uematsu | G03F 7/028 |
| 2018/0037758 | A1* | 2/2018 | Ishikawa | B29C 64/209 |
| 2021/0170669 | A1* | 6/2021 | Ota | B29C 64/112 |
| 2025/0223460 | A1* | 7/2025 | Hinote | B33Y 40/20 |

FOREIGN PATENT DOCUMENTS

| | | | | |
|---|---|---|---|---|
| JP | H08-184786 A | 12/1994 | | |
| JP | H08-325476 A | 12/1996 | | |
| JP | H11-326916 A | 11/1999 | | |
| JP | 2005-294311 A | 10/2005 | | |
| JP | 2010-283036 A | 12/2010 | | |
| JP | 2011-174972 A | 9/2011 | | |
| WO | WO 2002/093213 A1 | 5/2002 | | |
| WO | WO 2018-116900 | * | 6/2018 | B29C 64/112 |

OTHER PUBLICATIONS

Dougherty et al. ("Acryloyl Morpholine for UV Curing" RadTech Report, May/Jun. 2007) (Year: 2007).*

* cited by examiner

*Primary Examiner* — Jessica M Roswell
(74) *Attorney, Agent, or Firm* — Knobbe, Martens, Olson & Bear, LLP

(57) ABSTRACT

A polymerizable composition and a manufacturing method for an element-mounted substrate using the polymerizable composition. The polymerizable composition includes a water-soluble polymer, a nitrogen-containing monofunctional (meth)acrylic monomer, and a polymerization initiator. The composition is used to restrict a region where a sealing agent can flow in a sealing step in which at least a portion of an element provided on a substrate is sealed by using the sealing agent, and to form a sealing agent restricting material that is removed from the substrate after the sealing step.

7 Claims, No Drawings

POLYMERIZABLE COMPOSITION AND MANUFACTURING METHOD FOR ELEMENT-MOUNTED SUBSTRATE

CROSS-REFERENCE TO RELATED APPLICATIONS

This application is the U.S. National Phase under 35 U.S.C. § 371 of International Application PCT/JP2021/043797, filed Nov. 30, 2021, designating the U.S., and published in Japanese as WO 2022/138012 on Jun. 30, 2022 which claims priority to Japanese Patent Application No. 2020-216450 filed Dec. 25, 2020, the entire content of which is incorporated herein by reference.

TECHNICAL FIELD

The present invention relates to a polymerizable composition that is used for forming a sealing agent restricting material that is used to restrict a region where a sealing agent can flow in a sealing step in which at least a portion of an element provided on a substrate is sealed by using the sealing agent, the sealing agent restricting material being removed from the substrate after the sealing step; and a manufacturing method of an element-mounted substrate, the method using the polymerizable composition.

BACKGROUND ART

When various elements are mounted on a substrate, they are often completely sealed with resin or partially sealed with resin by so-called underfill. Resin as a sealing material is typically supplied to an area in the vicinity of elements in a molten state or in a solution state. However, using a liquid resin material for sealing makes it difficult to restrict a region where the liquid resin material flows.

Under such circumstances, for example, Patent Document 1 proposes a method of forming a dam agent, which is in contact with the side surface of an element to cover the outer peripheral portion of the element, in order to prevent a sealing material from entering a ball grid array portion of the element; this portion is provided at the bottom surface of the element which is in contact with a substrate. In the method described in Patent Document 1, if a failure occurs in the packaging of the element and the substrate, the dam agent is removed or the element fixed with the dam agent is peeled from the substrate to perform so-called rework. The dam agent for the rework is provided on a solder coating on the substrate. In this case, the solder coating is melted by heating the substrate to the melting point of the solder or higher, so that the dam agent or the element fixed with the dam agent can be easily peeled from the substrate.

Note that the dam agent itself does not contribute to the enhanced performance of the element. Thus, even if rework is not performed, the peeling of a dam agent from a substrate after the sealing of an element is frequently required. For example, when elements are densely integrated and mounted on a substrate, the elements are easily integrated with high density on the substrate by removing a dam agent after sealing the elements. For example, Patent Document 2 discloses a technique of sealing elements, which are present on a main surface of a substrate provided with a dam agent, using a sealing resin, and removing the dam agent to prevent an adverse effect on the subsequent steps such as a cutting step. Approaches described for the removal of the dam agent include peeling that is performed with adhesion reduced by curing using a thermosetting material as the material of the dam agent, and melting.

Patent Document 1: Japanese Unexamined Patent Application, Publication No. 2005-294311

Patent Document 2: Japanese Unexamined Patent Application, Publication No. 2010-283036

DISCLOSURE OF THE INVENTION

Problems to be Solved by the Invention

The method described in Patent Document 1 requires a complicated process of accurately forming a solder coating at the position of the dam agent. Furthermore, in the method described in Patent Document 1, molten solder derived from a solder coating may wetly spread on the substrate after the dam agent or the element fixed with the dam agent is peeled off. Under such circumstances, there is room for the development of materials that can form a dam agent easily removable from a substrate without using the melting of solder.

The present invention has been devised in view of the above problems. An object of the present invention is to provide a polymerizable composition that is used for forming a sealing agent restricting material. The sealing agent restricting material is used for restricting a region where a sealing agent can flow in a sealing step in which at least a portion of an element provided on a substrate is sealed by using the sealing agent, and is removed from the substrate after the sealing step. The sealing agent restricting material is easily removable from the substrate without using melting of solder. The present invention also provides a manufacturing method for an element-mounted substrate, the method using the polymerizable composition.

Means for Solving the Problems

The present inventors found that the above problems can be solved by using a polymerizable composition, which contains a water-soluble polymer, a nitrogen-containing monofunctional (meth)acrylic monomer, and a polymerization initiator. The polymerizable composition is used for forming a sealing agent restricting material, which restricts a region where a sealing agent can flow in a sealing step in which at least a portion of an element provided on a substrate is sealed by using the sealing agent, and which is removed from the substrate after the sealing step. Based on the finding, the inventors have completed the present invention. More specifically, the present invention provides the following:

A first aspect of the present invention is a polymerizable composition for forming a sealing agent restricting material, the sealing agent restricting material restricting a region where a sealing agent can flow in a sealing step in which at least a portion of an element provided on a substrate is sealed by using the sealing agent, and being removed from the substrate after the sealing step, wherein the polymerizable composition contains a water-soluble polymer, a nitrogen-containing monofunctional (meth)acrylic monomer, and a polymerization initiator.

A second aspect of the present invention is a manufacturing method of an element-mounted substrate, the method including:

forming a sealing agent restricting material on a substrate, the sealing agent restricting material restricting a region where a sealing agent can flow;

mounting an element on the substrate before or after the forming the sealing agent restricting material;

injecting a sealing agent into the above-mentioned region and sealing at least a portion of the element; and removing the sealing agent restricting material after the sealing at least the portion of the element, wherein the sealing agent restricting material is formed by applying the polymerizable composition according to the first aspect onto the substrate, followed by polymerizing the polymerizable composition.

Effects of the Invention

The present invention can provide a polymerizable composition that is used to form a sealing agent restricting material to thereby restrict a region where a sealing agent can flow in a sealing step in which at least a portion of an element provided on a substrate is sealed by using the sealing agent, the sealing agent restricting material being removed from the substrate after the sealing step. The sealing agent restricting material is easily removable from the substrate without using melting of solder. The present invention also can provide a manufacturing method of an element-mounted substrate, the method using the polymerizable composition.

<<Polymerizable Composition>>

A polymerizable composition is used for forming a sealing agent restricting material. The sealing agent restricting material restricts a region where a sealing agent can flow in a sealing step in which at least a portion of an element provided on a substrate is sealed by using the sealing agent, and the sealing agent restricting material is removed from the substrate after the sealing step. In this case, the region where a flow of the sealing agent is restricted includes a three-dimensional region, which is a part of a space on the principal surface of the substrate, as well as a two-dimensional region on the principal surface of the substrate. For example, the flowing range of the sealing agent in the thickness direction of the substrate can be restricted by adjusting the dimensions of the sealing agent restricting material in the thickness direction of the substrate.

The sealing agent restricting material is removed from the substrate after the sealing step. The removing method is not particularly limited but a method using water is preferable. A specific removing method will be described later in the manufacturing method for an element-mounted substrate.

The polymerizable composition contains a water-soluble polymer, a nitrogen-containing monofunctional (meth)acrylic monomer, and a polymerization initiator. The sealing agent restricting material is formed by polymerizing the polymerizable composition after forming the polymerizable composition into a desired shape.

In the specification and claims of the present application, (meth)acrylic means both acrylic and methacryl, (meth)acryloyl means both acryloyl and methacryloyl, and (meth)acrylate means both acrylate and methacrylate.

A viscosity of the polymerizable composition is preferably 1,000 cP or more and 300,000 cP or less and is more preferably 5,000 cP or more and 200,000 cP or less, the viscosity being measured at 25° C. by an E-type viscometer. In the above range of the viscosity of the polymerizable composition, the polymerizable composition is easily applied by dispensing, and the sealing agent restricting material in a preferable size and shape is easily and accurately formed at a predetermined position on the substrate.

An essential or optional component that can be contained in the polymerizable composition will be described below.

<Water-Soluble Polymer>

The polymerizable composition contains a water-soluble polymer. Thus, the sealing agent restricting material formed using the polymerizable composition exhibits high water solubility. The water solubility means that a solute (water-soluble polymer) of 0.5 g or more dissolves with respect to 100 g of water at 25° C.

Specific examples of the water-soluble polymer include a vinyl polymer, a cellulosic polymer, polyglycerol, and water-soluble nylon or the like. The vinyl polymer is a homopolymer of a monomer having a vinyl group or a copolymer having a vinyl group and is not particularly limited as long as it is water soluble. Examples of the vinyl polymer include polyvinyl alcohol, polyvinyl acetal (including a vinyl acetate copolymer), polyvinyl pyrrolidone, polyacrylamide, poly (N-alkylacrylamide), polyallylamine, poly (N-alkyl allylamine), partially amidated polyallylamine, poly(diallylamine), an allylamine-diallylamine copolymer, polyacrylic acid, a polyvinyl alcohol-polyacrylic acid block copolymer, and a polyvinyl alcohol-polyacrylate ester block copolymer. The cellulosic polymer is not particularly limited if it is a water-soluble cellulose or a cellulose derivative. Preferred specific examples of the cellulosic polymer include cellulose; alkyl celluloses such as methylcellulose, ethyl cellulose, n-propylcellulose, isopropyl cellulose, n-butylcellulose, tert-butylcellulose, and n-hexyl cellulose; hydroxyalkyl celluloses such as hydroxymethylcellulose, hydroxyethylcellulose, hydroxypropylcellulose, and hydroxybutyl cellulose; cellulose esters such as cellulose acetate, cellulose diacetate, cellulose triacetate, cellulose acetate propionate, and cellulose acetate butyrate; carboxyalkyl celluloses such as carboxymethyl cellulose, carboxyethyl cellulose, and carboxypropyl cellulose; and cellulose derivatives such as nitrocellulose, aldehyde cellulose, dialdehyde cellulose, and sulfonated cellulose or the like. One of these polymers may be used alone or two or more of these polymers may be used in combination.

Among the water-soluble polymers described above, a cellulosic polymer is preferable, hydroxyalkylcellulose is more preferable, and hydroxypropylcellulose is particularly preferable because heat resistance is high, a polymerizable composition with a viscosity suitable for dispensing application is easily obtained, and high compatibility with a nitrogen-containing monofunctional (meth)acrylic monomer is obtained.

The weight-average molecular weight of the above-described water-soluble polymer is preferably 15,000 or more and 300,000 or less and more preferably 20,000 or more and 200,000 or less. By using the water-soluble polymer having the weight-average molecular weight, the film formation of the polymerizable composition tends to be improved.

In thermogravimetric analysis, the reduction rate of the weight of the above-described water-soluble polymer is preferably 20% or less and is more preferably 10% or less when the temperature rises from room temperature to 200° C. By using the water-soluble polymer having such characteristics, an obtained sealing agent restricting material tends to have a stable shape also in a sealing step (for example, a sealing step using epoxy resin at about 200° C.). Typically, the conditions of the thermogravimetric analysis are the following contents:

Used device: TG/DTA device (Simultaneous Thermogravimetric Analyzer, manufactured by Hitachi High-Tech Corporation, TD/DTA6200R)

Rate of temperature increase: 10° C./minute

Atmosphere: air (a flow rate of 200 mL/minute)

The content of the water-soluble polymer in the polymerizable composition is preferably 1 mass; or more and 90 mass % or less, more preferably 3 mass % or more and 70 mass’ or less, and still more preferably 5 mass % or more and 50 mass % or less with respect to the total mass of the polymerizable composition. By using the water-soluble polymer with an amount in this range, the polymerizable composition tends to be obtained with a viscosity suitable for dispensing application, facilitating the formation of a sealing agent restricting material with lower compatibility with a sealing agent, e.g., an epoxy compound.

<Nitrogen-Containing Monofunctional (Meth)Acrylic Monomer>

The polymerizable composition contains a nitrogen-containing monofunctional (meth)acrylic monomer. Typically, a nitrogen-containing monofunctional (meth)acrylic monomer is liquid in an uncured state. Thus, a nitrogen-containing monofunctional (meth)acrylic monomer acts as a reactive dilution agent in the polymerizable composition. Specific forms of “nitrogen-containing monofunctional acrylic monomer” include both of (α) monofunctional (meth)acrylamide monomer and (β) a condensate (nitrogen-containing (meth)acrylic ester monomer) of (meth)acrylic acid and alcohol containing a nitrogen atom in its structure. Moreover, a nitrogen-containing monofunctional (meth)acrylic monomer produces a water-soluble (meth)acrylic polymer by polymerization. Hence, the sealing agent restricting material formed by using the polymerizable composition has high water solubility.

In view of the heat resistance of the sealing agent restricting material formed by using the polymerizable composition, a calculated value of a glass transition temperature of a nitrogen-containing monofunctional (meth)acrylic monomer as a homopolymer is preferably 100° C. or higher. A glass transition temperature as a homopolymer can be calculated by the Bicerano’s method (the method of Bicerano) described in Prediction of polymer properties, Marcel Dekker Inc, New York (1993).

[Monofunctional (Meth)Acrylamide Monomer]

The above-mentioned form of (α) will be described below. Preferred specific examples of a monofunctional (meth)acrylamide monomer include N,N-dimethyl(meth) acrylamide, N,N-diethyl(meth)acrylamide, and N,N-dipropyl(meth)acrylamide or the like.

Moreover, a (meth)acrylamide derivative expressed by formula (a1) is also preferable as a monofunctional (meth) acrylamide monomer because the derivative has a low viscosity and produces a polymer having high heat resistance and high water solubility.

[Chem. 1]

(a1)

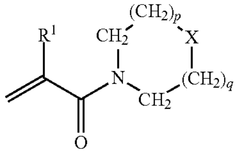

In formula (a1), $R^1$ is a hydrogen atom or a methyl group, X is a methylene group, —O—, —S—, or —$NR^2$—, $R^2$ is a hydrogen atom or an alkyl group having 1 or more and 4 or less carbon atoms, p and q are each independently an integer of 0 or more and 6 or less, and p+q is 1 or more and 6 or less.

For ease of acquisition and synthesis of a (meth)acrylamide derivative expressed by formula (a1) and the production of (meth)acrylic resin having high water solubility, it is preferable that p is 1 and q is 1 in formula (a1). In other words, a cyclic group in formula (1) preferably consists of a six-membered ring.

As mentioned above, X in formula (a1) is a methylene group, —O—, —S—, or —$NR^2$—, and $R^2$ is a hydrogen atom or an alkyl group having 1 or more and 4 or less carbon atoms. For ease of acquisition and synthesis of the (meth) acrylamide derivative expressed by formula (a1) and the production of (meth)acrylic resin having high water solubility, it is preferable that X is —O— in formula (a1).

Preferred specific examples of the (meth)acrylamide derivative expressed by formula (a1) are compounds below.

[Chem. 2]

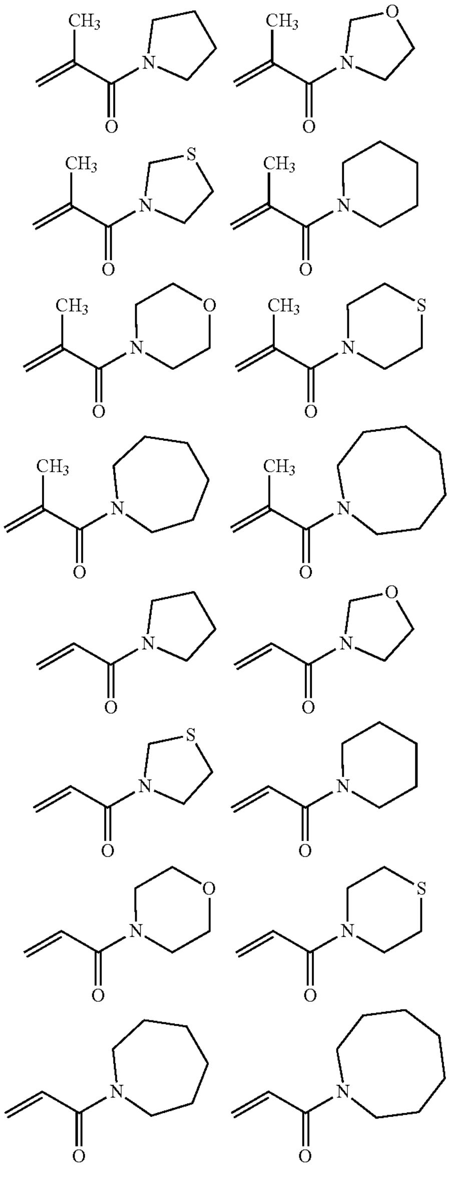

Among the above compounds, the following compounds are preferable.

[Chem. 3]

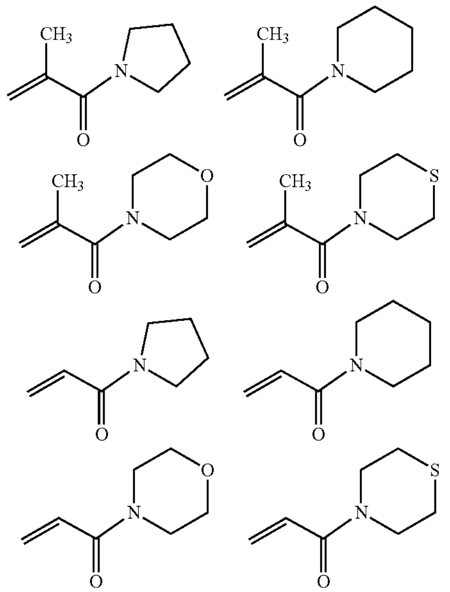

Among the above compounds, the following compounds are more preferable.

[Chem. 4]

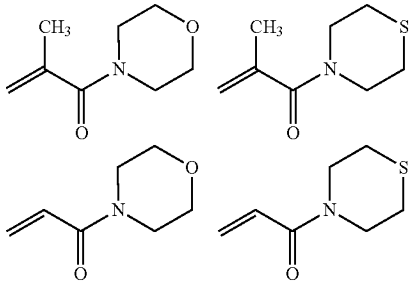

[Nitrogen-Containing (Meth)Acrylic Ester Monomer]

The above-mentioned form of (β) will be described below. The nitrogen-containing (meth)acrylic ester monomer is a compound having a condensed structure of (meth) acrylic acid and an alcohol compound containing a nitrogen atom in the structure. The alcohol compound containing the nitrogen atom in the structure has only one hydroxyl group in the structure.

A compound expressed by the following formula (a2) is preferable as the nitrogen-containing (meth)acrylic ester monomer because the compound has a low viscosity and produces a polymer having high heat resistance and high water solubility.

[Chem. 5]

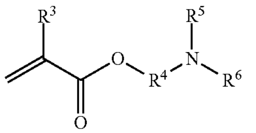

(a2)

In formula (a2), $R^3$ is a hydrogen atom or a methyl group, $R^4$ is an alkylene group having 1 or more and 5 or less carbon atoms, and $R^5$ and $R^6$ are each independently a hydrogen atom or an alkyl group having 1 or more and 5 or less carbon atoms. $R^5$ and $R^6$ may be combined with each other to form a ring composed of up to 11 members.

In view of the production of a polymer having high water solubility and the ease of availability, in formula (a2), $R^4$ is preferably an alkylene group having 1 or more and 3 or less carbon atoms, and $R^5$ and $R^6$ are both preferably alkyl groups, each having 1 or more and 5 or less carbon atoms. Moreover, $R^5$ and $R^6$ are preferably methyl groups or ethyl groups.

The content of the nitrogen-containing monofunctional (meth)acrylic monomer in the polymerizable composition is preferably 10 mass % or more and 99 mass % or less, more preferably 30 mass % or more and 97 mass % or less, and still more preferably 50 mass % or more and 95 mass % or less with respect to the total mass of the polymerizable composition. By using the nitrogen-containing monofunctional (meth)acrylic monomer with an amount in this range, the polymerizable composition is easily obtained with a viscosity suitable for dispensing application, facilitating the formation of a sealing agent restricting material having high heat resistance and water solubility.

<Polymerization Initiator>

The polymerizable composition contains a polymerization initiator to polymerize the above-mentioned nitrogen-containing monofunctional (meth)acrylic monomer. In order to polymerize the nitrogen-containing monofunctional (meth)acrylic monomer, a radical polymerization initiator is typically used as a polymerization initiator. The polymerization initiator may be a photopolymerization initiator that polymerizes the nitrogen-containing monofunctional (meth) acrylic monomer by exposure or may be a thermal polymerization initiator that polymerizes the nitrogen-containing monofunctional (meth)acrylic monomer by heating. The initiator is preferably a photopolymerization initiator in view of, for example, proper curing of the polymerizable composition in a short time.

Examples of the photopolymerization initiator include alkylphenone-based photopolymerization initiators such as Omnirad 651, Omnirad 184, Omnirad 1173, Omnirad 2959, Omnirad 127, Omnirad 907, Omnirad 369, Omnirad 369E, and Omnirad 379EG (all of them are manufactured by IGM Resins B.V.), acylphosphine oxide-based photopolymerization initiators such as Omnirad TPO H and Omnirad 819 (both of them are manufactured by IGM Resins B.V.), and oxime ester-based photopolymerization initiators such as Irgacure OXE01 and Irgacure OXE02 (both of them are manufactured by BASF AG) or the like. Among these initiators, alkylphenone-based photopolymerization initiators are preferable and Omnirad 651 (2,2-dimethoxy-2-phenylacetophenone) is more preferable in view of compatibility with the nitrogen-containing monofunctional (meth) acrylic monomer.

Specific examples of the photopolymerization initiator include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1, 2-diphenylethan-1-one, bis(4-dimethylaminophenyl)ketone, 2-methyl-1-[4-(methylthio) phenyl]-2-morpholinopropan-1-one, 2-benzil-2-dimethylamino-1-(4-morpholinophenyl)-butan-1-one, 1,2-octanedione, 1-[4-(phenylthio)phenyl]-,2-(O- benzoyloxime) (Irgacure OXE01), ethanone-1-[9-ethyl-6-(2-methylbenzoyl)-9H-carbazole-3-yl]-1-(O-acetyl oxime) (Irgacure OXE02), 2,4,6-trimethylbenzoyl diphenylphosphine oxide (Omnirad TPO H), bis(2,4,6-trimethylbenzoyl) phenylphosphine oxide (Omnirad 819), 4-benzoyl-4'-methyl dimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexyl benzoic acid, 4-dimethylamino-2-isoamyl benzoic acid, benzil-β-methoxyethyl acetal, benzil dimethylketal, 1-phenyl-1,2-propanedione-2-(0-ethoxycarbonyl)oxime, methyl o-benzoylbenzoate, 2,4-diethylthioxantone, 2-chlorothioxanthone, 2,4-dimethylthioxantone, 1-chloro-4-propoxythioxanthone, thioxanthen, 2-chlorothioxanthen, 2,4-diethylthioxanthen, 2-methylthioxanthen, 2-isopropylthioxanthen, 2-ethylanthraquinone, octamethyl anthraquinone, 1,2-benzanthraquinone, 2,3-diphenylanthraquinone, azobisisobutyronitrile, dibenzoyl peroxide, cumene hydroperoxide, 2-mercaptobenzimidazole, 2-mercaptobenzoxazole, 2-mercaptobenzothiazole, 2-(0-chlorophenyl)-4,5-di (m-methoxyphenyl)-imidazolyl dimer, benzophenone, 2-chlorobenzophenone, p,p'-bis dimethylamino benzophenone, 4,4'-bis diethylamino benzophenone, 4,4'-dichlorobenzophenone, 3,3-dimethyl-4-methoxybenzophenone, benzil, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyl trichloroacetophenone, p-tert-butyl dichloroacetophenone, α,α-dichloro-4-phenoxyacetophenone, thioxanthone, 2-methyl thioxanthone, 2-isopropylthioxanthone, dibenzosuberone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris (trichloromethyl)-s-triazine, 2-methyl-4,6-bis (trichloromethyl)-s-triazine, 2-[2-(5-methylfuran-2-yl) ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis (trichloromethyl)-s-triazine, 2-[2-(3,4-dimethoxyphenyl) ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy) styrylphenyl-s-triazine, and 2,4-bis-trichloromethyl-6-(2-bromo-4-methoxy)styrylphenyl-s-triazine or the like. One of these photopolymerization initiators may be used alone or two or more of the photopolymerization initiators may be used in combination.

Examples of the thermal polymerization initiator include organic peroxides such as ketone peroxide (e.g., methyl ethyl ketone peroxide and cyclohexanone peroxide), peroxy ketal (e.g., 2,2-bis(tert-butylperoxy)butane and 1,1-bis(tert-butylperoxy)cyclohexane), hydroperoxide (e.g., tert-butyl hydroperoxide and cumene hydroperoxide), dialkyl peroxide (e.g., di-tert-butyl peroxide (PERBUTYL (registered trademark) D (manufactured NOF CORPORATION) and di-tert-hexyl peroxide (PERHEXYL (registered trademark) D (manufactured by NOF CORPORATION)), diacyl peroxide (e.g., isobutyryl peroxide, lauroyl peroxide, and benzoyl peroxide), peroxydicarbonate (e.g., diisopropyl peroxydicarbonate), and peroxy ester (e.g., tert-butyl peroxyisobutyrate and 2,5-dimethyl-2,5-di((benzoylperoxy) hexane); and azo compounds such as 1,1'-azobis(cyclohexane-1-carbonitrile), 2,2'-azobisisobutyronitrile, 2,2'-azobis(2,4-dimethyl-4-methoxyvaleronitrile), 2,2'-azobis(2-methylpropionamidine)dihydrochloride, 2,2'-azobis[2-methyl-N-(2-propenyl)propionamidine]dihydrochloride, 2,2'-azobis(2-methylpropionamide), 2,2'-azobis[2-methyl-N-(2-hydroxyethyl)propionamide], 2,2'-azobis(2-methylpropane), 2,2'-azobis(2,4,4-trimethylpentane), and dimethyl 2,2'-azobis(2-methyl propionate).

The content of the photopolymerization initiator in the polymerizable composition is preferably 0.01 mass % or more and 10 mass % or less, more preferably 0.05 mass % or more and 8 mass % or less, and still more preferably 0.1 mass % or more and 5 mass % or less with respect to the total mass of the polymerizable composition. By using the photopolymerization initiator with an amount in this range, the polymerizable composition is properly cured with ease when the sealing agent restricting material is formed.

<Other Components>

The polymerizable composition may contain various addition agents as components other than the above-described components as necessary. The addition agents include a sensitizing agent, a curing accelerating agent, a dispersing agent, coupling accelerating agents such as a silane coupling agent, an anti-oxidizing agent, a deflocculating agent, a thermal polymerization inhibiting agent, an antifoaming agent, and a surface-active agent. The amounts of use of these addition agents are determined as appropriate in consideration of the amounts of the addition agents to be used in the polymerizable composition.

<Solvent>

The polymerizable composition may be solvent-free or may contain a solvent for adjusting the application properties. The polymerizable composition is preferably solvent-free. The solvent may be water, an organic solvent, or an aqueous solution of an organic solvent. The content of the polymerizable composition is preferably kept to a minimum. For example, the content is preferably 5 mass % or less, more preferably 3 mass % or less, and still more preferably 1 mass % or less.

Predetermined amounts of the components described above are evenly mixed, thereby obtaining the polymerizable composition.

<<Manufacturing Method for Element-Mounted Substrate>>

A manufacturing method for an element-mounted substrate, the manufacturing method including:

- forming a sealing agent restricting material on a substrate, the sealing agent restricting material restricting a region where a sealing agent can flow;
- mounting an element on the substrate before or after the step of forming the sealing agent restricting material;
- injecting a sealing agent into the above-mentioned region and sealing at least a portion of the element; and
- removing the sealing agent restricting material after the step of sealing at least a portion of the element,
- wherein the sealing agent restricting material is formed by polymerizing the polymerizable composition after applying the polymerizable composition according to the first aspect onto the substrate. The steps will be described below.

In the step of forming the sealing agent restricting material on the substrate, the sealing agent restricting material restricting the region where the sealing agent can flow, the kind of substrate where the element is mounted is not particularly limited. The polymerizable composition mentioned above is polymerized after being applied to a position where the sealing agent restricting material is to be formed on the substrate, so that the sealing agent restricting material is formed on the substrate. A method for applying the polymerizable composition is not particularly limited. Various printing methods and application methods are applicable. The polymerizable composition is preferably applied by dispensing onto the substrate in view of ease of formation of the sealing agent restricting material in a desired shape and thickness.

The polymerizable composition applied onto the substrate is exposed and/or heated depending on the kind of polymerization initiator contained in the polymerizable composition. The polymerizable composition containing a photopolymerization initiator is preferably exposed in view of ease of quick and uniform curing of the polymerizable composition. The conditions for exposing the polymerizable composition to be cured are not particularly limited if the polymerizable composition is properly cured. The exposure is performed by the irradiation of active energy lines such as ultraviolet rays and excimer laser beams. The amount of energy line irradiation is, for example, 30 $mJ/cm^2$ or more and 5,000 $mJ/cm^2$ or less and is not particularly limited.

The sealing agent restricting material on the substrate may be located at any position where a flow of a sealing agent is to be restricted. The sealing agent restricting material is preferably formed to perfectly surround the outer periphery of the element mounted on the substrate. Typically, the sealing agent is injected into a region surrounded by the sealing agent restricting material formed to perfectly surround the outer region of the element, thereby making it possible to restrict the flow of the sealing agent to the outside from the region surrounded by the sealing agent restricting material while sealing at least a portion of the element with the sealing agent.

The sealing agent restricting material is ordinarily formed into a strip having a certain thickness. The width and thickness of the sealing agent restricting material are not particularly limited and are determined as appropriate in consideration of, for example, the size of the element and the way of sealing the element. Typically, the thickness of the sealing agent restricting material is preferably 10 μm or more and 1,000 μm or less and is more preferably 100 μm or more and 500 μm or less. The width of the sealing agent restricting material is preferably 5 μm or more and 50 mm or less and is more preferably 100 μm or more and 5 mm or less. The thickness of the sealing agent restricting material is typically a thickness in a vertical direction with respect to the planar direction of the substrate. The width of the sealing agent restricting material is typically a width in a direction parallel to the planar direction of the substrate.

In the step of mounting the element on the substrate before or after the step of forming the sealing agent restricting material, the element is mounted at a predetermined position on the substrate. The element to be mounted may be simply placed on the substrate, or the element and the substrate may be electrically connect to each other using a ball grid array or the like.

In the step of injecting the sealing agent into the above-mentioned region and sealing at least a portion of the element, the sealing agent is injected into the region in which a flow of the sealing agent is restricted by the sealing agent restricting material. Typically, the sealing agent is a liquid hardening resin material. A hardening resin material containing an epoxy compound is preferably used as a liquid hardening resin material because a hardened material is produced with high mechanical strength, heat resistance, and chemical resistance or the like. A hardening resin material containing an epoxy compound typically contains various curing agents and accelerating agents. Alternatively, a hardening resin material may contain inorganic fillers such as silica.

Examples of the epoxy compound include bifunctional epoxy resins such as bisphenol A epoxy resin, bisphenol F epoxy resin, bisphenol S epoxy resin, bisphenol AD epoxy resin, naphthalene epoxy resin, and biphenyl epoxy resin; novolac epoxy resins such as phenolic novolac epoxy resin, brominated phenolic-novolac epoxy resin, ortho-cresol novolac epoxy resin, bisphenol A novolac epoxy resin, and bisphenol AD novolac epoxy resin; cyclic aliphatic epoxy resins such as an epoxide of dicyclopentadiene phenol resin; aromatic epoxy resins such as an epoxide of naphthalene phenol resin; glycidyl ester epoxy resins such as dimer acid glycidyl ester and triglycidyl ester; glycidyl amine epoxy resins such as tetraglycidylaminodiphenylmethane, triglycidyl-p-aminophenol, tetraglycidyl meta-xylenediamine, and tetraglycidylbis aminomethylcyclohexane; heterocyclic epoxy resins such as triglycidyl isocyanurate; trifunctional epoxy resins such as phloroglucinol triglycidyl ether, trihydroxybiphenyl triglycidyl ether, trihydroxyphenyl methane triglycidyl ether, glycerol triglycidyl ether, 2-[4-(2,3-epoxypropoxy)phenyl]-2-[4-[1,1-bis[4-(2,3-epoxypropoxy)phenyl]ethyl]phenyl]propane, and 1,3-bis[4-[1-[4-(2,3-epoxypropoxy)phenyl]-1-[4-[1-[4-(2,3-epoxypropoxy)phenyl]-1-methyl ethyl]phenyl]ethyl]phenoxy]-2-propanol; tetrafunctional epoxy resins such as tetrahydroxyphenyl ethane tetraglycidyl ether, tetraglycidylbenzophenone, bisresorcinol tetraglycidyl ether, and tetra-glycidoxy biphenyl; and a 1,2-epoxy-4-(2-oxiranyl) cyclohexane adduct of 2,2-bis(hydroxy methyl)-1-butanol. The 1,2-epoxy-4-(2-oxiranyl) cyclohexane adduct of 2,2-bis(hydroxy methyl)-1-butanol is commercially available as EHPE-3150 (manufactured by Daicel Corporation).

Furthermore, an oligomer or polymer polyfunctional epoxy compound can also be preferably used. Typical examples of the oligomer or polymer polyfunctional epoxy compound include a phenolic novolac epoxy compound, a brominated phenolic-novolac epoxy compound, an ortho-cresol novolac epoxy compound, a xylenol novolac epoxy compound, a naphthol novolac epoxy compound, a bisphenol A novolac epoxy compound, a bisphenol AD novolac epoxy compound, an epoxide of dicyclopentadiene phenol resin, and an epoxide of naphthalene phenol resin.

The injecting amount of the sealing agent is properly selected according to the way of sealing the element. The form of sealing may be so-called underfill that fixes only the underside of the element with the sealing agent near the substrate, or a sealing method that fully covers the element with the sealing agent. If the sealing agent is a curing resin material, the injected sealing agent is typically cured by exposure and/or heating according to the composition of the sealing agent.

In the step of removing the sealing agent restricting material after the step of sealing at least a portion of the element, the method for removing the sealing agent restricting material is not particularly limited. The sealing agent restricting material is preferably brought into contact with water to be dissolved in water, enabling the easy removal of the sealing agent restricting material. This is because the sealing agent restricting material formed by curing the above-mentioned polymerizable composition has proper solubility in water. The method of bringing the sealing agent restricting material with water is not particularly limited.

The substrate provided with the sealing agent restricting material may be immersed in water, water may be applied onto the sealing agent restricting material, running water may be poured onto the sealing agent restricting material, or the sealing agent restricting material may be sprayed with water. The temperature of water to be brought into contact with the sealing agent restricting material is not particularly limited. In view of the acceleration of dissolution of the sealing agent restricting material, for example, water may be heated to 40° C. or higher and 90° C. or lower.

EXAMPLES

The present invention will be more specifically described below in accordance with examples. The scope of the present invention is not limited to these examples.

Example 1

100 parts by mass of hydroxypropylcellulose (HPC SSL, manufactured by Nippon Soda Co., Ltd.), 150 parts by mass of N-acryloylmorpholine, and 4.5 parts by mass of Omnirad 651 (2,2-dimethoxy-2-phenylacetophenone (manufactured by IGM Resins B.V.)) were evenly mixed to obtain a polymerizable composition. A viscosity of the obtained polymerizable composition exceeded 200,000 cP, the viscosity being measured at 25° C. by an E-type viscometer.

By applying the obtained composition of Example 1 in layers by using a dispenser (SHOT MASTER3, manufactured by Musashi Engineering, Inc.) with a needle diameter φ of 0.4 mm, a pressure of 0.46 MPa, a speed of 1 mm/sec, and a gap of 1 mm between substrates, a dam pattern was applied with a height of 250 μm and a line width of 1.6 mm on a silicon substrate. The uncured dam pattern was irradiated with exposure light at 500 mJ/cm$^2$ by using an ultra-high pressure mercury lamp to thereby form a hardened material. The hardened material was heated at 180° C. for 120 minutes in a hot-air oven. After the absence of a significant change was confirmed on the heated dam pattern having a height of 250 μm and a line width of 1.8 mm, the hardened material was immersed in pure water at 55° C. for 30 minutes to peel off a dam material, and then the absence of a remaining film was confirmed.

Example 2

100 parts by mass of hydroxypropylcellulose (HPC SSL, manufactured by Nippon Soda Co., Ltd.), 150 parts by mass of N,N-dimethylacrylamide, and 4.5 parts by mass of Omnirad 651 (2,2-dimethoxy-2-phenylacetophenone (by IGM Resins B.V.)) were evenly mixed to obtain a polymerizable composition.

A viscosity of the obtained polymerizable composition was 18,821 cP, the viscosity being measured at 25° C. by an E-type viscometer.

By applying the obtained composition of Example 2 in layers by using a dispenser (SHOT MASTER3, manufactured by Musashi Engineering, Inc.) with a needle diameter φ of 0.4 mm, a pressure of 0.46 MPa, a speed of 1 mm/sec, and a gap of 1 mm between substrates, a dam pattern was applied with a height of 300 μm and a line width of 1.6 mm on a silicon substrate. The uncured dam pattern was irradiated with exposure light at 500 mJ/cm$^2$ by using an ultra-high pressure mercury lamp to thereby form a hardened material. The hardened material was heated at 180° C. for 120 minutes in a hot-air oven. After the absence of a significant change was confirmed on the heated dam pattern having a height of 300 μm and a line width of 1.7 mm, the hardened material was immersed in pure water at 55° C. for 30 minutes to peel off a dam material, and then the absence of a remaining film was confirmed.

Example 3

100 parts by mass of hydroxypropylcellulose (HPC SSL, manufactured by Nippon Soda Co., Ltd.), 150 parts by mass of N,N-diethylacrylamide, and 4.5 parts by mass of Omnirad 651 (2,2-dimethoxy-2-phenylacetophenone (by IGM Resins B.V.)) were evenly mixed to obtain a polymerizable composition. A viscosity of the obtained polymerizable composition was 191,421 cP, the viscosity being measured at 25° C. by an E-type viscometer.

By applying the obtained composition of Example 3 in layers by using a dispenser (SHOT MASTER3, manufactured by Musashi Engineering, Inc.) with a needle diameter φ of 0.4 mm, a pressure of 0.46 MPa, a speed of 1 mm/sec, and a gap of 1 mm between substrates, a dam pattern was applied with a height of 250 μm and a line width of 1.7 mm on a silicon substrate. The uncured dam pattern was irradiated with exposure light at 500 mJ/cm$^2$ by using an ultra-high pressure mercury lamp to thereby form a hardened material. The hardened material was heated at 180° C. for 120 minutes in a hot-air oven. After the absence of a significant change was confirmed on the heated dam pattern having a height of 250 μm and a line width of 1.8 mm, the hardened material was immersed in pure water at 55° C. for 30 minutes to peel off a dam material, and then the absence of a remaining film was confirmed.

Example 4

100 parts by mass of hydroxypropylcellulose (HPC SSL, manufactured by Nippon Soda Co., Ltd.), 150 parts by mass of dimethylaminoethyl acrylate, and 4.5 parts by mass of Omnirad 651 (2,2-dimethoxy-2-phenylacetophenone (by IGM Resins B.V.)) were evenly mixed to obtain a polymerizable composition. A viscosity of the obtained polymerizable composition exceeded 200,000 cP, the viscosity being measured at 25° C. by an E-type viscometer.

By applying the obtained composition of Example 4 in layers by using a dispenser (SHOT MASTER3, manufactured by Musashi Engineering, Inc.) with a needle diameter φ of 0.4 mm, a pressure of 0.46 MPa, a speed of 1 mm/sec, and a gap of 1 mm between substrates, a dam pattern was applied with a height of 250 μm and a line width of 1.7 mm on a silicon substrate. The uncured dam pattern was irradiated with exposure light at 500 mJ/cm$^2$ by using an ultra-high pressure mercury lamp to thereby form a hardened material. The hardened material was heated at 180° C. for 120 minutes in a hot-air oven. After the absence of a significant change was confirmed on the heated dam pattern having a height of 250 μm and a line width of 1.8 mm, the hardened material was immersed in pure water at 55° C. for 30 minutes to peel off a dam material, and then the absence of a remaining film was confirmed.

Comparative Example 1

100 parts by mass of an amine water-soluble polymer, 150 parts by mass of dipentaerythritol hexaacrylate, and 4.5 parts by mass of Omnirad 651 (2,2-dimethoxy-2-phenylacetophenone (manufactured by IGM Resins B.V.)) were evenly mixed to obtain a polymerizable composition. By using the polymerizable composition of Comparative Example 1, dissolution and exfoliation were conducted on a sealing agent restricting material with water according to the same method as Example 1. The sealing agent restricting material formed using the polymerizable composition of Comparative Example 1 was not fully peeled off.

The invention claimed is:

1. A polymerizable composition comprising a water-soluble polymer, wherein the water-soluble polymer is a cellulosic polymer, a nitrogen-containing monofunctional (meth)acrylic monomer, and a polymerization initiator, wherein a content of the nitrogen-containing monofunctional (meth)acrylate monomer in the polymerizable composition is 50 mass % or more and 95 mass % or less with respect to the total mass of the polymerizable composition.

2. The polymerizable composition according to claim 1, wherein the nitrogen-containing monofunctional (meth) acrylic monomer is a compound represented by the following formula (a1):

(a1)

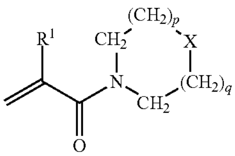

wherein $R^1$ is a hydrogen atom or a methyl group, X is a methylene group, —O—, —S—, or —$NR^2$—, $R^2$ is a hydrogen atom or an alkyl group having 1 or more and 4 or less carbon atoms, p and q are each independently an integer of 0 or more and 6 or less, and p+q is 1 or more and 6 or less.

3. The polymerizable composition according to claim 1, wherein the nitrogen-containing monofunctional (meth) acrylic monomer is a compound represented by the following formula (a2):

(a2)

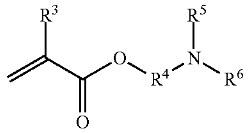

wherein $R^3$ is a hydrogen atom or a methyl group, $R^4$ is an alkylene group having 1 or more and 5 or less carbon atoms, and $R^5$ and $R^6$ are each independently a hydrogen atom or an alkyl group having 1 or more and 5 or less carbon atoms, and $R^5$ and $R^6$ may be bonded to each other to form a 11-membered ring at the maximum.

4. The polymerizable composition according to claim 1, wherein a calculated value of a glass transition temperature of the nitrogen-containing monofunctional (meth)acrylic monomer as a homopolymer is 100° C. or higher.

5. The polymerizable composition according to claim 1, wherein the polymerization initiator is a photopolymerization initiator.

6. The polymerizable composition according to claim 5, wherein the photopolymerization initiator is an alkylphenone-based photopolymerization initiator.

7. The polymerizable composition according to claim 1, wherein a viscosity measured at 25° C. by an E-type viscometer is 1,000 cP or more and 300,000 cP or less.

* * * * *